United States Patent [19]

Kurokawa et al.

[11] Patent Number: 5,448,476

[45] Date of Patent: Sep. 5, 1995

[54] DISTRIBUTED WATER FLOW PREDICTING DEVICE

[75] Inventors: Fuktoshi Kurokawa, Fuchu; Shuichiro Kobayashi, Bunkyo; Tadayoshi Murayama, Kawasaki, all of Japan

[73] Assignee: Kabushiki Kaisha Toshiba, Kawasaki, Japan

[21] Appl. No.: 262,070

[22] Filed: Jun. 17, 1994

[30] Foreign Application Priority Data

Jun. 17, 1993 [JP] Japan .................................. 5-146494

[51] Int. Cl.⁶ .................... G06F 17/60; G05B 17/02; G05B 13/04; G05D 7/00
[52] U.S. Cl. .................................. 364/420; 395/914
[58] Field of Search ............... 364/420, 401, 510, 148, 364/149, 150, 151, 164, 165; 137/78.1, 78.5, 79, 236.1; 395/928, 930, 931, 914, 906

[56] References Cited

U.S. PATENT DOCUMENTS

| | | | |
|---|---|---|---|
| 4,180,083 | 12/1979 | Miyaoka et al. | 364/420 |
| 4,200,911 | 4/1980 | Matsumoto | 364/410 |
| 4,308,150 | 12/1981 | Miyaoka et al. | 210/739 |
| 4,569,012 | 2/1986 | Sekozawa et al. | 364/420 |
| 5,229,937 | 7/1993 | Evelyn-Veere | 364/420 |

FOREIGN PATENT DOCUMENTS 3-134703 6/1991 Japan .
4-220758 8/1992 Japan .
4-330502 11/1992 Japan .

OTHER PUBLICATIONS

Takebayashi, 05-248358, "Water Level Control Device", Sep. 24, 1993, Patent Abstracts of Japan, vol. 18, No. 6, English Abstract.

Kurokawa et al., 05-199808, "Water Distribution Quantity Pattern Predicting Device", May 18, 1993, Patent Abstracts of Japan, vol. 17, No. 485, English Abstract.

Tsukamoto et al., 04-330502, "Water Supply Demand Predicting System", Nov. 18, 1993, Patent Abstracts of Japan, vol. 17, No. 170, English Abstract.

Kurokawa et al., 04-195603, "Daily Water Distribution Amount Prediction Device", Patent Abstracts of Japan, vol. 16, no. 525, English Abstract.

Kosuda, 03-202515, "Device For Predicting Demand of Water Delivery Amount", Patent Abstracts of Japan, vol. 15, No 473, English Abstract.

Baba et al., 03-134706, "Knowledge Acquiring Method For Supporting Operation of Sewage—Treatment", Patent Abstracts of Japan, vol. 15, No. 352, English Abstract.

Honda et al., 02-264355, "Water Demand Predicting (List continued on next page.)

Primary Examiner—Donald E. McElheny, Jr.
Attorney, Agent, or Firm—Foley and Lardner

[57] ABSTRACT

The distributed water flow predicting device comprises seasonal prediction model learning means for learning weight coefficients by back propagation over a prediction model a neural network model for predicting daily distributed water flows and specific characters of an hourly distributed water flow pattern for a season, based on processed actual seasonal weather data and seasonal distributed water flows, so as to identify the prediction model. Seasonal distributed water flow predicting means pridicts daily distributed water flows and specific characters of hourly distributed water flow patterns for a required season by using the prediction model, based on inputted information about the weather, temperature, a weekday or a holiday. The seasonal distributed water flow predicting means compares the specific characters of an hourly distributed water flow pattern given by the prediction model with specific characters of past actual distributed water flow patterns so as to retrieve a most similar hourly distributed flow pattern from the past actual distributed water flow patterns, giving the retrieved pattern as a predicted hourly distributed water flow pattern, and multiplys the predicted daily distributed water flow by the predicted hourly distributed water flow pattern to predict an hourly distributed water flow.

6 Claims, 4 Drawing Sheets

OTHER PUBLICATIONS

Device", Patent Abstracts of Japan, vol. 15, No. 20, English Abstract.

Arakawa, 63-163610, "Control System For Network of Water Distribution Pipe", Patent Abstracts of Japan, vol. 12, No. 431, English Abstract.

Miyaoka et al., 56-7110, "Operation Control Method For Waterworks System", Patent Abstracts of Japan, vol. 5, No. 52, English Abstract.

Coulbeck et al., "Real—Time Optimized Control of Water Distribution Systems", Control 88 (IEE Conf. Pub. 285), 1988, pp. 634–638.

Hartley et al., "A Combined Approach To Demand Prediction ", IEE Colloq., 1990, No. 071: Control and Optimisation Techniques for the Water...,3 pages.

Dellow, "Use of the Watchman Software for Optimal Pump Scheduling in Water Supply Systems", IEE Colloq., 1990, No. 071: Control and Optimisation Techniques for the Water..., 3 pages.

Boger, Zvi, "Application of Neural Networks To Water and Wastewater Treatment Plant Operation", ISA Transactions, vol. 31, No. 1, 1992, pp. 25–33.

Canu, S. et al., "Formal Neural Network as an Adaptive Model For Water Demand ", INNC90 Paris Int. Neural Network Conference, vol. 1, 1990, pp. 131–136.

Tsugura, Hiroshi, et al., "System Control For Water Supply", Meiden Review, Series No. 88, No. 1, 1990, pp. 13–19.

Cubero, Robert, "Neural Networks For Water Demand Time Series Forecasting", Artificial Neural Networks Int. Workshop, IWANN, 1991, issue 6, pp. 453–460.

Brdys, "Optimizing Control of Water Supply/Distribution Networks", IEE Colloq., (1990) No. 135: Control and Optimisation Techniques for the Water..., 5 pages.

DISTRIBUTED WATER FLOW PREDICTING DEVICE

BACKGROUND OF THE INVENTION

1. Field of the Invention

The present invention relates to a distributed water flow predicting device for predicting a distributed water flow rate from a purification plant of a water-supply facility or a service reservoir, especially a distributed water flow predicting device using a neural network model.

2. Related Background Art

In a water supply system, raw water is taken in from a dam-type reservoir in a mountain or a river and is led in a conduit to a purification plant. It takes a long period of time to lead the raw water from the intake plant to the purification plant. In principle flocculation, sedimentation or filtration of a purification process in the purification plant, cause a large time delay. Accordingly it is difficult to work the process from the intake to the distribution on feedback control in accordance with water demand changes. Thus it is necessary to predict a water demand for a day and make a water operational plan from intake at the water-supply plant to water distribution.

Water demand flow change in accordance with 1) seasons, 2) meteorological conditions, such as weathers, temperatures, etc., 3) social life conditions, such as days of the week, special days, holidays, May holidays, New Year holidays, etc.

Thus to make a water operational plan from intake at a water-supply plant to distribution, a prediction model is identified statistically by actual distributed water flow data and it predicts a distributed water flow rate hourly one after another.

But the conventional method so-called sequential prediction method cannot make a daily water operational plan. Because the conventional method does not have learning ability based on actual data which are obtained every day as instruction signals, past distributed water flow data cannot be effectively used, and accordingly seasonal water demand changes and long-span structural changes due to population changes, piping works, etc. cannot be followed. Consequently daily operations rely on experts or plant operators.

An object of the present invention is to solve the above-described problems, and to provide a water demand predicting device which has ability of learning actual distributed water flow data and can predict a daily distributed water flow and hourly distributed water flow throughout a day for each season.

SUMMARY OF THE INVENTION

To achieve the above-described object, the present invention relates to a device for predicting an hourly distributed water flow throughout a day to be distributed from a purification plant or a service reservoir of a water-supply facility, and the device comprises actual seasonal weather data processing means for processing actual seasonal weather data, based on stored past actual weather data, and information of a weekday or a holiday; seasonal distributed water flow data processing means for processing actual seasonal distributed water flow, based on actual hourly distributed water flow rates for every day; to identify the prediction mode; seasonal prediction model learning means for learning weight coefficients of neural network by back propagation over a prediction model to predict daily distributed water flow and specific character of an hourly distributed water flow pattern for a season, based on processed data supplied by the seasonal actual weather data processing means and the seasonal distributed water data processing means; and seasonal distributed water flow predicting means for predicting daily distributed water flows and specific characters of an hourly distributed water flow pattern for a required season by using the prediction model, based on inputted information about the weather, temperature, a weekday or a holiday, for comparing the specific character of an hourly distributed water flow pattern given by the prediction model with specific character of past actual distributed water flow patterns stored in the seasonal distributed water flow data processing means so as to retrieve a most similar hourly distributed flow pattern from the past actual distributed water flow patterns, giving the retrieved pattern as a predicted hourly distributed water transition pattern, and for multiplying the predicted daily distributed water flow by the predicted hourly distributed water flow pattern to predict an hourly distributed water flow.

In the present invention, actual weather data are processed for each season, based on past actual whether data and hourly distributed water flow data, and a daily distributed water flow and specific characters of an hourly distributed water flow pattern are extracted and stored.

Weight coefficients are learned by back propagation by the instruction signals of a neural network (outputs) are daily distributed water flow and specific character of hourly distributed water flow patterns, and actual weather data, as of their corresponding weathers, temperatures, etc., and information of weekdays or holidays, whereby a prediction model of the neural network for predicting daily distributed water flow and hourly distributed water flow patterns is given.

Information as to a weather and temperatures of a day, a weekday or a holiday, etc. are inputted to select a prediction model for predicting a daily distributed water flow for a season, and specific character of an hourly distributed water flow pattern. Based on the selected prediction model, a daily distributed water flow is predicted, while hourly distributed water flow pattern specific characters based on the selected prediction model are compared with past actual distributed water flow pattern specific characters to thereby retrieve the most similar hourly distributed water flow pattern from past actual distributed water flow patterns and provide it as a predicted hourly distributed water flow pattern. The predicted hourly distributed water flow pattern is simply a normalized hourly distributed water flow pattern. To give an actual hourly distributed water flow pattern, the predicted daily distributed water flow and the predicted hourly distributed water flow pattern are multiplied to predict an hourly distributed water flow for the day.

DETAILED DESCRIPTION OF PREFERRED EMBODIMENT

One embodiment of the present invention will be explained with reference to the drawings.

Figure 1:
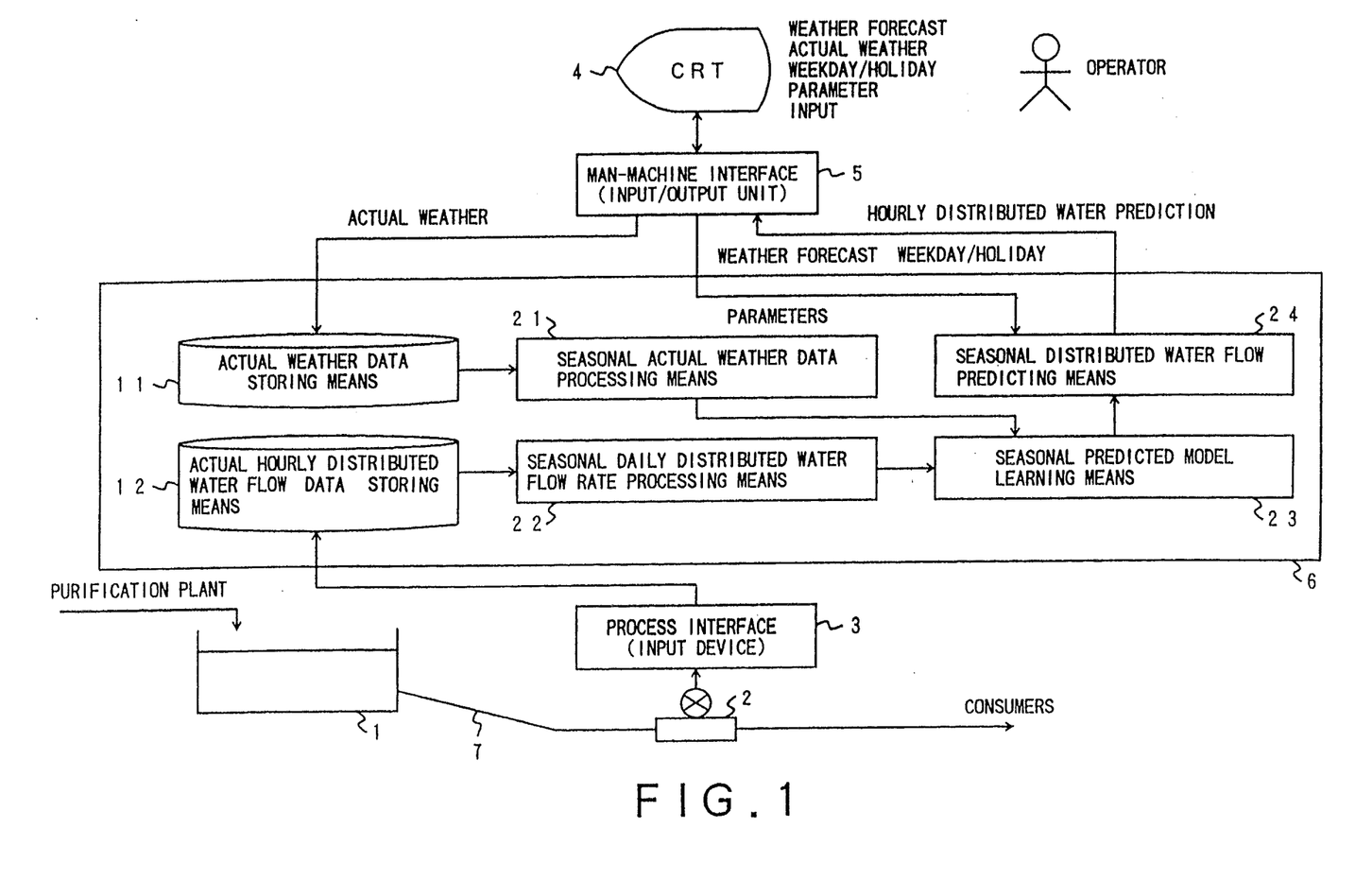
FIG. 1 is a block diagram schematically showing the structure of the device for predicting distributed water flow rate according to the present invention.

FIG. 1 is a block diagram schematically showing the structure of the embodiment. In FIG. 1, supply water from a purification plant is distributed to consumers in a natural flow through a water distribution pipe 7 from a reservoir 1. A flow detector 2 for detecting a distributed water flow is provided in the water distribution pipe 7. A distributed water flow detected by the water flow detector 2 is inputted to computing means 6 through a process interface (input means) 3.

The computing means 6 is supplied by a man-machine interface (input/output means) 5 with weather forecasts, actual weather data, a weekday or a holiday, and set parameter values (parameters, etc. for retrieving a similar pattern), and supplies (predicted hourly distributed water flow for the day) to a CRT 4. The inputted actual weather data are stored in an actual weather data 11.

The computing means 6 includes seasonal distributed water flow data processing means 22, seasonal actual weather data processing means 21 for processing the actual weather data 11, seasonal prediction model learning means 23 for identifying a prediction model by a neural network, and seasonal hourly distributed water flow predicting means for predicting hourly distributed water flow for the day.

Then, the four means built in the computing means 6 will be explained with reference to FIGS. 1, 2, 3, 4 and 5, and how the consumption prediction by a neural network is conducted will be explained.

[A] Actual seasonal weather data processing means 21

In FIG. 1, information as to actual weathers, highest temperatures and lowest temperatures, etc. of a certain day, and a weekday or a holiday, etc. are stored in the actual weather data storing means 11.

Figure 2:
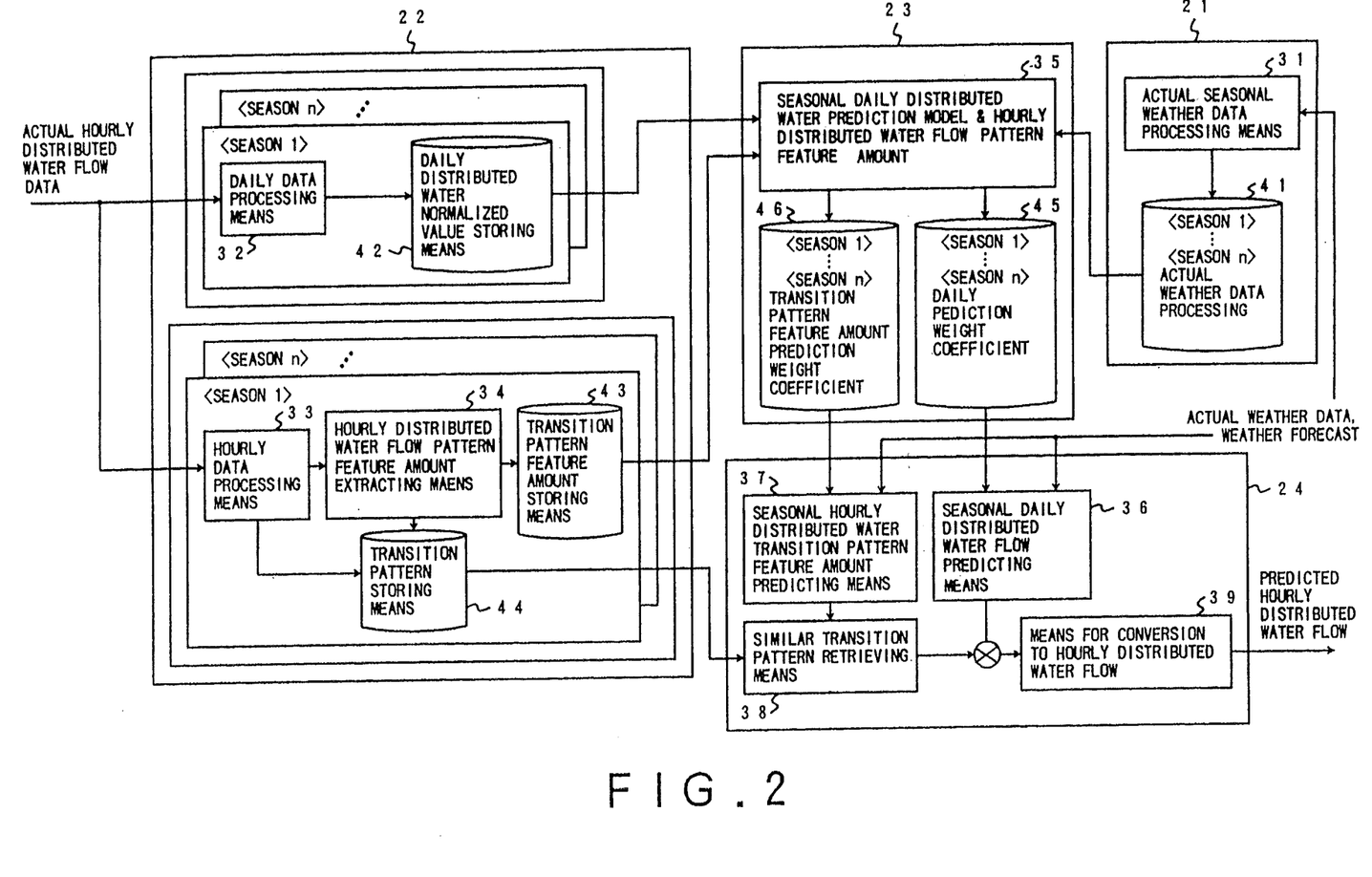
FIG. 2 is a block diagram detailing a major constitution of the device of FIG. 1.

The stored actual weather data are supplied to the actual seasonal weather data processing means 21 as in FIG. 2 to be seasonally processed as inputs to the neural network by the actual seasonal weather data processing means 21.

The yearly data are divided seasonally as follows.

<Season 1>...... January to March
<Season 2>...... April to June
<Season 3>...... July to September
<Season 4>...... October to December  (1)

All the following processing is seasonally made, and suffixes denoting the seasons are omitted to simplify formulas.

As information of weathers, weathers of the mornings and the afternoons of a certain day and its immediately previous day are supplied as input information to the neural network, and fine, cloudy and rainy weathers are converted into the following analog values.

| | | |
|---|---|---|
| Fine | a | (2) |
| Cloudy | b | |
| Rainy | c | | where a, b and c are −1 to 1 analog values,

A highest and a lowest temperatures are converted into the following analog values, A mean and variance of highest temperatures are given based on actual highest temperatures, $$\overline{\Theta}\text{max} = \sum_{i=1}^{n} \Theta\text{max}(i)/n \quad (3)$$

$$\sigma\theta\text{max} = \sqrt{\left(\sum_{i=1}^{n} (\overline{\Theta}\text{max} - \Theta\text{max}(i))2\right)/(n-1)} \quad (4)$$

where Θmax: actual highest temperature for i-th day [°C.]

$\overline{\Theta}$max: mean of highest temperature [°C.]

δΘmax: variance of highest temperatures [°C.]

n : data number.

Then a bias deflection from a mean of highest temperature is computed by the following formula.

$$\widetilde{\Theta}\text{max}(i) = \frac{\Theta\text{max}(i) - \overline{\Theta}\text{max}}{\sigma\theta\text{max}} \quad (5)$$

where $\widetilde{\Theta}$max is a bias from a mean of highest temperature.

A mean and variance of lowest temperatures are given based on actual lowest temperatures.

$$\overline{\Theta}\text{min} = \sum_{i=1}^{n} \Theta\text{min}(i)/n \quad (6)$$

$$\sigma\theta\text{min} = \sqrt{\left(\sum_{i=1}^{n} (\overline{\Theta}\text{min} - \Theta\text{min}(i))2\right)/(n-1)} \quad (7)$$

where Θmin(i): actual lowest temperature for i-th day [°C.]

$\overline{\Theta}$min : mean of lowest temperature [°C.]

δΘmin : variance of lowest temperatures [°C.]

n : data number.

Then a bias from a mean of lowest temperature is computed by the following formula.

$$\widetilde{\Theta}\text{min}(i) = \frac{\Theta\text{min}(i) - \overline{\Theta}\text{min}}{\sigma\theta\text{min}} \quad (8)$$

where $\widetilde{\Theta}$min: a bias from a mean of lowest temperature for i-th day Information of a weekday or a holiday is converted into the following analog values.

Weekday d
Holiday e  (9)

where d and e are −1 to 1 analog values.

The obtained weather input information are stored in the actual weather data storing means 41 and it is used as input information for identifying a neural network prediction model.

[B] Seasonal distributed water flow data processing means 22

A hourly distributed water flow value inputted through the process interface (input means) 3 is stored by the actual hourly distributed water flow data storing means 12. The data stored by the storing means 12 is processed by a daily data processing means 32 and its data is an instruction signal (an output) of a prediction model and is stored by a daily distributed water flow normalizing means 42. As for an instruction signal (an output) of an hourly distributed water flow pattern prediction model, the data stored by the actual hourly distributed water flow data storing means 12 is processed by an hourly data processing means 33. After specific characters are extracted from the processed data by the hourly distributed water flow pattern specific character extracting means 34, the specific characters are stored by the pattern specific character storing means 43. An hourly distributed water flow pattern normalized by the hourly data processing means 33, and hourly distributed water flow pattern specific characters extracted by the hourly distributed water flow pattern specific character extracting means 34 are stored by a transition pattern storing means 44.

Then daily and hourly distributed water flow data processing method will be explained.

As shown in FIG. 2, a daily distributed water flow normalized value 42 as an instruction signal of the neural network is processed as follows by the daily data processing means 32.

$$Q(i) = \sum_{j=0}^{23} Qh(i,j) \quad (10)$$

$$Qt(i) = (Q(i) - Qmin)/(Qmax - Qmin) \quad (11)$$

where Qh(i,j): an actual daily distributed water flow at j o'clock, i-th day [m3/hour]

Q(i) : an actual daily distributed water flow [m3/day]
Qmax: a maximum distributed water flow [m3/day]
Qmin : a minimum distributed water flow [m3/day]
Qt(i) : a normalized distributed water flow for i day.

A normalized daily distributed water flow by Formula (11) is stored by the daily distributed water flow normalized value storing means 42.

Then the daily distributed water flow pattern specific characters as an instruction signal of the neural network will be explained.

Actual hourly distributed water flow data is normalized by the hourly data processing means 33 as the following formula.

$$Qh - n(i,j) = \frac{Qh(i,j)}{\sum_{j=0}^{23} Qh(i,j)} \quad (12)$$

where Qh(i,j): an actual hourly distributed water flow at j o'clock of i-th day [m3/hour]

Qh-n(i,j): a normalized hourly distributed water flow value at i o'clock of i-th day [%].

A normalized hourly distributed water flow value given by Formula 12 is stored by the pattern storing means 44.

Then, in an hourly distributed water flow pattern for i-th day, hourly distributed water flow pattern specific characters to be extracted will be explained with reference to FIG. 3.

Figure 3:
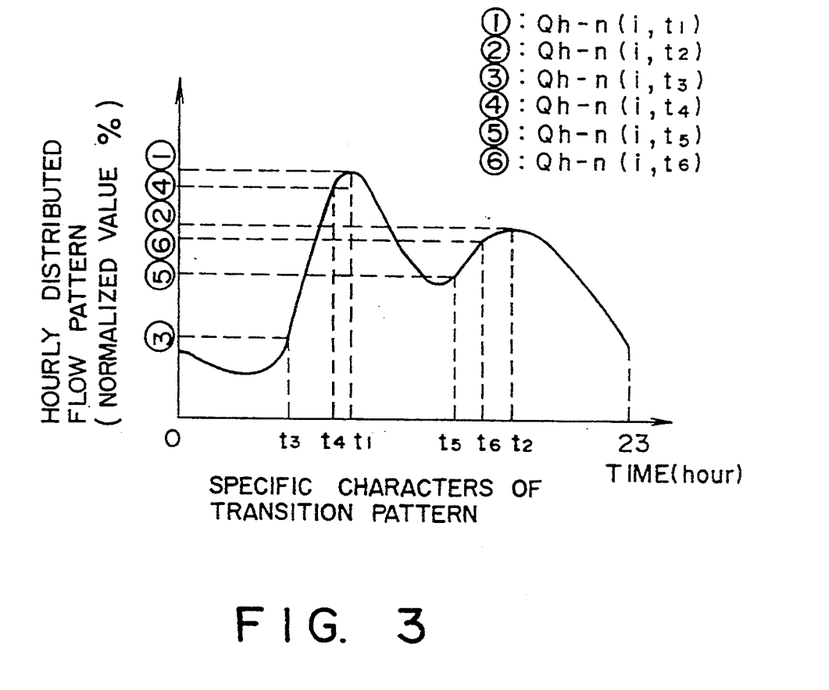
FIG. 3 is a view of transition pattern specific characters.

FIG. 3 shows a normalized hourly distributed water flow pattern for i-th day. In FIG. 3, a peak value of the hourly distributed water flow pattern in the morning and that in the afternoon, and an inclination of a rise of the distributed water in the morning and an inclination of a rise of the distributed water in the afternoon are given by the following formulas.

$$Pam(i) = Qh - n(i, t_1) \quad (13)$$
$$Ppm(i) = Qh - n(i, t_2) \quad (14)$$

-continued
$$kam(i) = \frac{Qh - n(i, t_4) - Qh - n(i, t_3)}{t_4 - t_3} \quad (15)$$

$$kpm(i) = \frac{Qh - n(i, t_6) - Q(i, t_5)n - h}{t_6 - t_5} \quad (16)$$

where Qh-n(i,t$_1$): a normalized hourly distributed water amount at t$_1$ o'clock of i-th day Qh-n(i, t$_2$): a normalized hourly distributed water amount at t$_2$ o'clock of i-th day Qh-n(i, t$_3$): a normalized hourly distributed water amount at t$_3$ o'clock of i-th day Qh-n(i, t$_4$): a normalized hourly distributed water amount at t$_4$ o'clock of i-th day Qh-n(i,t$_5$): a normalized hourly distributed water amount at t$_5$ o'clock of i-th day Qh-n(i-t$_6$): a normalized hourly distributed water amount at t$_6$ o'clock of i-th day Pam(i): a peak value of i-th day in the morning [%]
Ppm(i): a peak value of i-th day in the afternoon [%]
Kam(i): an inclination of a rise of a distributed water amount in the morning of i-th day [%]
Kpm(i): an inclination of a rise of a distributed water amount in the afternoon of i-th day [%].

The above-described computation is conducted for a season, and extracted specific characters are stored by the pattern storing means 44 and the pattern specific characters storing means 43.

[C] Seasonal prediction model learning means 23

Based on a normalized daily distributed water flow value and pattern specific character, weight coefficients of the neural network for the daily distributed water flow prediction model and the hourly distributed water flow pattern are given for a season by a seasonal prediction mode learning means 23.

Figure 4:
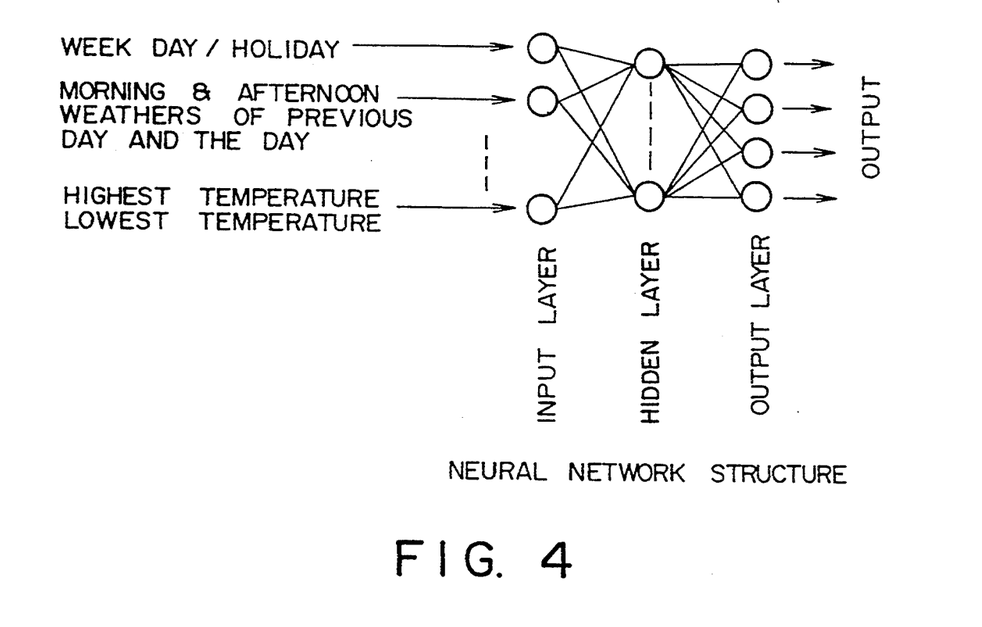
FIG. 4 is a view explanatory of a neural network.

As shown in FIG. 4, the neural network has a three layer structure of an input layer, a hidden layer and an output layer. A daily distributed water flow and hourly distributed water flow pattern prediction model, weathers in the morning and the afternoon of a specific day and its previous day, highest and lowest temperatures of the specific day, a weekday or a holiday are inputted, as input information, to neurons of the input layer.

In the daily distributed water flow prediction model, a normalized daily distributed water flow value is instruction data, and neurons of the output layer. In the hourly distributed water flow pattern prediction model, pattern specific characters are instruction data, and neurons of the output layer.

Learning of weight coefficients between the neurons of the neural network is conducted by back propagation. Weight coefficients of the daily distributed water flow prediction model and the hourly distributed water flow pattern prediction model obtained by the learning are stored respectively by a daily prediction weight coefficient storing means 45 and a transition pattern specific characters prediction weight coefficient storing means 46.

Here the back propagation is a learning method in which errors of a hierarchical neural network are reversely propagated from an output layer to an input layer.

Next the learning procedure will be explained. To simplify formulas, suffixes daily, hourly, and seasonal are omitted.

Step 1: Information as to actual weathers and temperatures, and a weekday or a holiday are inputted to the input layer, and the hidden layer and the output layer are computed in accordance with the neuron models. An output of the j-th neuron of the hidden layer is given $$Hj = f\left(\sum_{i=1}^{l} wij \cdot Ii\right) \quad (j = 1, \ldots, m) \tag{17}$$

where Ii : an output of the i-th neuron of the input layer
wij : a weight coefficient between the i-th neuron of the input layer and the j-th neuron of the hidden layer
l : a number of the input layers
m : a number of the hidden layers
fO : a threshold function of the hidden layers.

An output Ok of the k-th neuron of the output layer is given by $$Ok = \sum_{j=1}^{m} wjk \cdot Hj \quad (k = 1, \ldots, n) \tag{18}$$

where wjk: a weight coefficient between the j-th neuron of the hidden layer and the k-th neuron of the output layer
m : a number of the hidden layers
n : a number of the output layers.

Step 2: A weight coefficient of the network is corrected to be learned so that a sum of square errors between an output Ok of the k-th neuron of the output layer and an instruction signal yk of the k-th neuron of the output layer is minimized. The learning of a weight coefficient between the hidden layer and the output layer computes $\Delta wjk$ in the following formulas and wjk is corrected.

$$wjk(t+1) = wjk(t) + \Delta wjk(t) \tag{19}$$

$$\Delta wjk(t) = -\epsilon \cdot dk(t) \cdot Hj(t) \tag{20}$$

$$dk(t) = Ok(t) - yk(t) \tag{21}$$

where t : times of the learning
$\epsilon$: a parameter for determining a magnitude of one correction
dk : an error of the output layer.

Learning of a weight coefficient between the input layer and the hidden layer computes $\Delta wjk$ and wjk is corrected.

$$wij(t+1) = wij(t) + \Delta wik(t) \tag{22}$$
$$\Delta wij(t) = -\epsilon \cdot dj(t) \cdot Ii(t) \tag{23}$$

$$dj(t) = \left\{\sum_{k=1}^{n} wjk(t) \cdot dk(t)\right\} \cdot f'\left(\sum_{i=1}^{l} wij(t) \cdot Ii(t)\right) \tag{24}$$

where dj : a reverse propagation error f'O: a differential of fO.

Furthermore, the following formulas are used to decrease oscillations and accelerate the learning.

$$\Delta wjk(t) = -\epsilon \cdot dk(t) \cdot Hj(t) + \alpha \cdot \Delta wjk(t-1) \tag{25}$$

$$\Delta wij(t) = -\epsilon \cdot dj(t) \cdot Ii(t) + \alpha \cdot \Delta wij(t-1) \tag{26}$$

where $\alpha$ is a parameter for stabilization.

Thus obtained weight coefficients; are stored by the daily prediction weight coefficient storing means 45 and the pattern specific character prediction weight coefficient storing means 46.

[D] Seasonal distributed water flow predicting means 24

Then, the seasonal distributed water flow predicting means 24 for predicting an hourly distributed water flow for a day will be explained. Based on inputted actual weathers of the morning and the afternoon of the previous day, forecast weather and temperatures of the day, and information of a weekday or a holiday, weight coefficients stored in the daily prediction weight coefficient storing means 45 and the pattern specific characters prediction weight coefficient storing means 46, a seasonal daily distributed water flow predicting means 36 and a seasonal hourly distributed water flow pattern specific character predicting means 37 compute values of the output layers of the daily distributed water flow predicting model and the hourly distributed water flow pattern predicting model by the use of the weight coefficients stored by the daily prediction weight coefficient storing means 45 and the pattern specific character predicting weight coefficient storing means 46 in accordance with the computation of the neural network.

The computed hourly distributed water flow predicted value for a day is a normalized value, and is accordingly converted to a distributed water flow for the day by the seasonal daily distributed water flow predicting means 36.

Base on the information of the obtained hourly distributed water flow pattern specific characters, a pattern having most similar specific characters is retrieved by a similar pattern retrieving means 38 by the following formula.

$$I(i) = |Pam' - Pam(i)| + |Ppm' - Ppm(i)| + \tag{27}$$
$$|kam' - kam(i)| + |kpm' - kpm(i)|$$
$$(i = 1, \ldots, n)$$

where Pam': a peak value of distributed water amounts in the morning (a predicted value of the neural network)

Ppm': a peak value of distributed water mounts in the afternoon (a predicted value of the neural network)

Kam': an inclination of a rise of distributed water amounts in the morning (a predicted value of the neural network)

Kpm': an inclination of a rise of distributed water amounts in the afternoon (a predicted value of the neural network)

Pam(i): a peak value of distributed water amounts in the morning of i-th day

Ppm(i): a peak value of distributed water amounts in the afternoon of i-th day

Kam(i): an inclination of a rise of distributed water amounts in the morning of i-th day Kpm(i): an inclination of a rise of distributed water amounts in the afternoon of i-th day n : a number of retrieved data I(i): a similarity value between a predicted value and an actual value of past i-th day.

Figure 5:
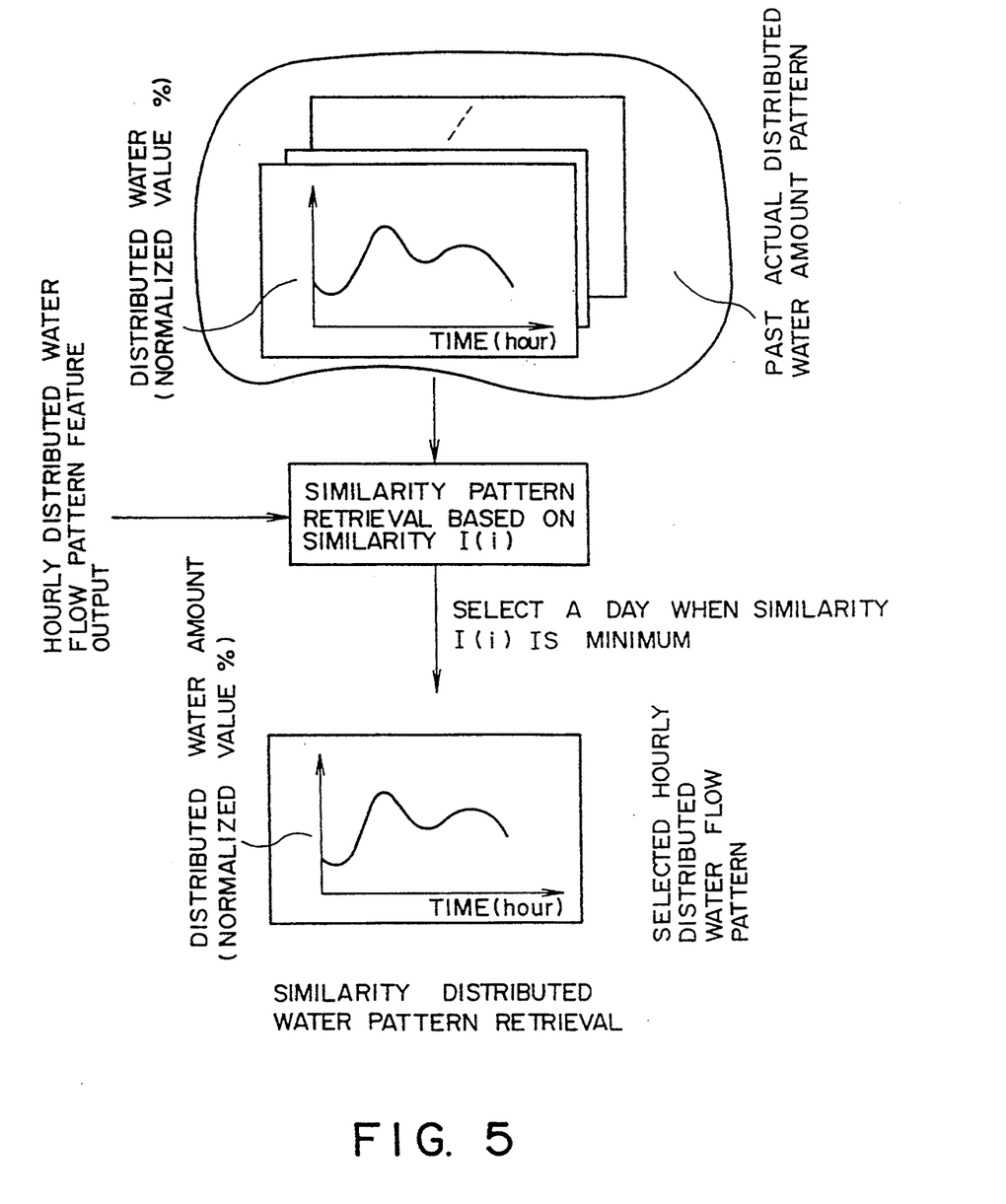
FIG. 5 is a view explanatory of retrieving a similar distributed water flow pattern.

When a sum (a similarity value) of an absolute value of a deviation between specific characters; of a computed value and specific characters an actual value of the i-th day is smallest, the daily distributed water flow pattern of a day is predicted as an hourly distributed water flow pattern for the day (FIG. 5).

The obtained distributed water flow pattern for the day is multiplied by the above-described predicted daily distributed water flow value by means for conversion to an hourly distributed water flow 39 and it is outputted to a CRT 4.

By adding a ratio between a morning and an afternoon peak values to Formula (27), an hourly distributed water flow pattern can be retrieved with higher precision. The following formula gives a similarity value.

$$I(i) = |Pam' - Pam(i)| + |Ppm' - Ppm(i)| + |kam' - kam(i)| + |kpm' - kpm(i)| + |Cap' - Cap(i)| \quad (28)$$
$$(i = 1, \ldots, n)$$

where Pam': a peak value of distributed water amounts in the morning (a predicted value of the neural network)

Ppm': a peak value of distributed water mounts in the afternoon (a predicted value of the neural network)

Kam': an inclination of a rise of distributed water amounts in the morning (a predicted value of the neural network)

Kpm': an inclination of a rise of distributed water amounts in the afternoon (a predicted value of the neural network)

Pam(i): a peak value of distributed water amounts in the morning of i-th day

Ppm(i): a peak value of distributed water amounts in the afternoon of i-th day

Kam(i): an inclination of a rise of distributed water amounts in the morning of i-th day Kpm(i): an inclination of a rise of distributed water amounts in the afternoon of i-th day C2p(i): a ratio between morning and afternoon peak distributed water amounts of i-th day n : a number of retrieved data I(i): a similarity value between a predicted value and an actual value of past i-th day.

When a sum (a similarity value) of an absolute value of a deviation between specific characters of a computed predicted value and specific characters of an actual value of the i-th day is smallest, the daily distributed water flow pattern of a day is predicted as an hourly distributed water flow pattern for the day.

The predicted distributed water flow pattern for the day is multiplied by the above-described predicted daily distributed water flow value by means for conversion to an hourly distributed water flow 39 and it is outputted to a CRT 4.

In the above-described specific character extraction, by adding a time of a morning peak value, and a time of an afternoon peak value, an hourly distributed water flow pattern can be predicted with higher precision. For this case, the following formula is used to compute a similarity value.

$$I(i) = |Pam' - Pam(i)| + |Ppm' - Ppm(i)| + |kam' - kam(i)| + |kpm' - kpm(i)| + |Cap' - Cap(i)| + |Pamt' - Pamt(i)| + |Ppmt' - Ppmt(i)| \quad (29)$$
$$(i = 1, \ldots, n)$$

where Pam': a peak value of distributed water amounts in the morning (a predicted value of the neural network)

Ppm': a peak value of distributed water amounts in the afternoon (a predicted value of the neural network)

Kam': an inclination of a rise of distributed water amounts in the morning (a predicted value of the neural network)

Kpm': an inclination of a rise of distributed water amounts in the afternoon (a predicted value of the neural network)

Cap': a ratio between a morning and an afternoon peaks (a predicted value of the neural network)

Pamt': time when the morning peak value is present (value converted to $-1$-$1$) (a predicted value of the neural network)

Ppmt': time when the afternoon peak value is present (value converted to $-1$-$1$) (a predicted value of the neural network)

Pam(i): a peak value of distributed water amounts in the morning of i-th day

Ppm(i): a peak value of distributed water amounts in the afternoon of i-th day

Kam(i): an inclination of a rise of distributed water amounts in the morning of i-th day Kpm(i): an inclination of a rise of distributed water amounts in the afternoon of i-th day Cap(i): a ratio between morning and afternoon peak distributed water amounts of i-th day Pamt(i):time of a morning peak value for i-th day sent (value converted to $-1 \sim 1$)

Ppmt(i):time of an afternoon peak value for i-th day (value converted to $-1 \sim 1$)

n : a number of retrieved data

I(i) : a similarity value between a predicted value and an actual value of past i-th day.

When a sum (a similarity value) of an absolute value of a deviation between specific characters of a predicted value and specific characters of an actual value of the i-th day is smallest, the daily distributed water flow pattern of a day is predicted as an hourly distributed water flow pattern for the day.

The predicted distributed water flow pattern for the day is multiplied by the above-described predicted daily distributed water flow value by means for conversion to an hourly distributed water flow rate 39 and it is outputted to a CRT 4.

In the above-described formulas for computing a similarity value, weights are added to absolute values of deviations between respective specific characters so as to make clearer intended specific characters index values can be more flexibly conducted. For this case, the following formula is used to give a similarity value.

$$I(i) = W1*|Pam' - Pam(i)| + W2*|Ppm' - Ppm(i)| + W3*|kam' - kam(i)| + W4*|kpm' - kpm(i)| + W5*|Cap' - Cap(i)| + W6*|Pamt' - Pamt(i)| + W7*|Ppmt' - Ppmt(i)| \quad (30)$$
$$(i = 1, \ldots, n)$$

where Pam': a peak value of distributed water amounts in the morning (a predicted value of the neural network)

Ppm': a peak value of distributed water amounts in the afternoon (a predicted value of the neural network)

Kam': an inclination of a rise of distributed water amounts in the morning (a predicted value of the neural network)

Kpm': an inclination of a rise of distributed water amounts in the afternoon (a predicted value of the neural network)

Cap': a ratio between a morning and an afternoon peaks (a predicted value of the neural network)

Pamt': time of the morning peak value (value converted to $-1\sim1$) (a predicted value of the neural network)

Ppmt': time of the afternoon peak value (value converted to $-1\sim1$) (a predicted value of the neural network)

Pam(i): a peak value of distributed water amounts in the morning of i-th day

Ppm(i): a peak value of distributed water amounts in the afternoon of i-th day

Kam(i): an inclination of a rise of distributed water amounts in the morning of i-th day Kpm(i): an inclination of a rise of distributed water amounts in the afternoon of i-th day Cap(i): a ratio between morning and afternoon peak distributed water amounts of i-th day Pamt(i): time of a morning peak value for i-th day (value converted to $-1$-$1$)

Ppmt(i): time of an afternoon peak value for i-th day is present (value converted to $-1$-$1$)

W1 : a parameter representing a weight for a peak value of morning distributed water amounts W2 : a parameter representing a weight for a peak value of afternoon distributed water amounts W3 : a parameter representing a weight for an inclination of a rise of morning distributed water amounts W4 : a parameter representing a weight for an inclination of a rise of afternoon distributed water amounts W5 : a parameter representing a weight for a ratio of morning and afternoon peak values W6 : a parameter representing a weight for time of a peak value in the morning W7 : a parameter representing a weight for time of a peak value in the afternoon n : a number of retrieved data I(i) : a similarity value between a predicted value and an actual value of past i-th day.

W1, W2, W3, W4, W5, W6 and W7 are parameters representing which information is significant for a character a distributed water flow pattern and are analog values of 0 to 1. These parameters are inputted through the man-machine interface (input/output means) 5 by an operator. Specific characters of an hourly distributed water flow pattern include accumulated values of hourly distributed water flow rates in the morning and afternoon for a set period of time from rising points.

Next, the operation of this embodiment will be explained.

Based on past actual weather data 11 and hourly distributed water flow data 12, actual weather data are processed for seasons, and daily distributed water flow and specific characters hourly distributed water flow patterns are extracted and stored.

Weight coefficients are learned by back propagation by the use of a neural network whose instruction signals (outputs) are daily distributed water flow accumulated for seasons and specific characters of hourly distributed water flow patterns, and actual weather data, as of their corresponding weathers, temperatures, etc., and information of are weekdays or holidays, whereby a prediction model of the neural network for predicting daily distributed water flow and hourly distributed water flow patterns is given by the seasonal predicting model learning means 23.

Information as to a weather and temperatures of a day, whether the day is a weekday or a holiday, etc. are inputted to select a prediction model for predicting a daily distributed water flow for a season, and specific characters of an hourly distributed water flow pattern. Based on the selected prediction model, a daily distributed water flow is predicted, while hourly distributed water flow pattern specific characters are compared with past actual distributed water flow pattern specific characters to thereby retrieve the most similar hourly distributed water flow pattern from past actual distributed water flow patterns and provide it as a predicted hourly distributed water flow pattern. The predicted hourly distributed water flow pattern is simply a normalized hourly distributed water flow pattern. To give an actual hourly distributed water flow pattern, the predicted daily distributed water flow rate value and the predicted hourly distributed water flow pattern value are multiplied by each other to predict an hourly distributed water flow for the day.

Thus, the present embodiment has the ability to learn actual ditributed water flow data and can predict a daily distributed water flow and hourly distributed water flows throughout a day for a season. Accordingly economical and stable water supply can be planned depending on a season, a day of the week, weather conditions, etc.

In the above-described embodiment, a device for learning an hourly distributed water flow pattern from actual distributed water amounts so as to predict hourly distributed water amounts for a day has been explained. But the present invention is not limted to the device and can cover, for example, the following modified system.

That is, in predicting an hourly distributed water flow pattern, in place of an hourly transition pattern a 30 minute-transition pattern, for example, or shorter time transition patterns can be predicted as long as a period of time is short. A season is not essentially actual four seasons, and may be a long period of time, e.g., a month, which is relatively longer to the short period of time.

Thus according to the present invention, based on actual hourly distributed water flow, a prediction model for prdicting a daily distributed water flow can be identified while a prediction model for extracting specific characters of an hourly distributed water flow rates, and predicting characteristics of the transition pattern can be identified, and an hourly distributed water flow pattern similar to a past actual distributed water flow pattern can be retrieved based on a similarity value, whereby a predicition model effectively using past actual distributed water flow vlues can be provided. Actual distributed water flow data daily accumulated are learned for a season, whereby a prediction model which can follow seasonal consumption changes, and middle- and long-term changes of distributed water flow can be provided. Operational plans of service reservoirs and purification plants can be made, which enables the service reservoirs and purification plants to be efficiently operated.

What is claimed is:

1. A distributed water flow predicting device for predicting an hourly distributed water flow rate for a day to be distributed from a purification plant or a service reservoir of a water-supply facility, the device comprising:

actual seasonal weather data processing means for processing actual seasonal weather data, based on stored past actual weather data, and information of a weekday or a holiday;

seasonal distributed water flow data processing means for processing actual seasonal distributed water flows, based on actual hourly distributed water flows for every day;

seasonal prediction model learning means for learning weight coefficients of a neural network model by back propagation over a prediction model for predicting daily distributed water flows and specific characters of an hourly distributed water flow pattern for a season, based on processed data supplied by the seasonal actual weather data processing means and the seasonal distributed water flow data processing means, so as to identify the prediction model; and seasonal distributed water flow predicting means for predicting daily distributed water flows and specific characters of an hourly distributed water flow pattern for a required season by using the prediction model, based on inputted information about the weather, temperature, a weekday or a holiday, for comparing the specific characters of an hourly distributed water flow pattern given by the prediction model with specific characters of past actual distributed water flow patterns stored in the seasonal distributed water flow data processing means so as to retrieve a most similar hourly distributed flow pattern from the past actual distributed water flow patterns, giving the retrieved pattern as a predicted hourly distributed water flow pattern, and for multiplying the predicted daily distributed water flow by the predicted hourly distributed water flow pattern to predict an hourly distributed water flow.

2. The distributed water flow predicting device according to claim 1, wherein
the specific characters of the hourly distributed water flow pattern compared by the seasonal distributed water flow predicting means include peak values of distributed water flows in the morning and afternoon, and rise values in the morning and afternoon.

3. The distributed water flow predicting device according to claim 2, wherein
the specific characters of the hourly distributed water flow pattern further include a ratio of the peak values in the morning and afternoon.

4. The distributed water flow predicting device according to claim 3, wherein
the specific characters of the hourly distributed water flow pattern includes a time when the peak value in the morning takes place, and a time when the peak value in the afternoon takes place.

5. The distributed water flow rate predicting device according to claim 4, wherein
the specific characters of the hourly distributed water flow rate transition pattern further includes accumulated values of distributed water flows per a unit period of time from the rise points in the morning and afternoon.

6. The distributed water flow rate predicting device according to claim 1, wherein
the specific characters of the hourly distributed water flow pattern include various values indicative of information of the pattern, and the various values are weighted corresponding to their significance to be compared with the actual distributed water flow patterns.

* * * * *